United States Patent [19]

Sonnenberger et al.

[11] 4,419,752

[45] Dec. 6, 1983

[54] CIRCUIT ARRANGEMENT FOR TRANSMITTING TWO SIGNALS OVER ONE LINE IN OPPOSITE DIRECTIONS

[75] Inventors: Paul Sonnenberger; Wilhelm Graffenberger, both of Hamburg, Fed. Rep. of Germany; Adriaan Cense, Wychen, Netherlands; Petrus A. M. Van Westen, Oeffelt, Netherlands

[73] Assignee: U.S. Philips Corporation, New York, N.Y.

[21] Appl. No.: 282,200

[22] Filed: Jul. 10, 1981

[30] Foreign Application Priority Data

Jul. 31, 1980 [DE] Fed. Rep. of Germany ....... 3029054

[51] Int. Cl.³ .............................................. H04N 5/04
[52] U.S. Cl. ........................................ 370/29; 370/31; 358/20; 358/33
[58] Field of Search .................................... 370/24–32; 358/149, 20, 33; 178/4.1 R, 4.1 B; 340/504, 346

[56] References Cited

U.S. PATENT DOCUMENTS

| | | | |
|---|---|---|---|
| 3,843,834 | 10/1974 | Burke | 370/31 |
| 3,967,058 | 6/1976 | Moriya et al. | 370/29 |
| 3,967,059 | 6/1976 | Moore et al. | 370/31 |
| 4,253,116 | 2/1981 | Rodgers | 358/149 |
| 4,279,033 | 7/1981 | Brunelli et al. | 370/29 |
| 4,287,589 | 9/1981 | Nakamura et al. | 370/31 |

FOREIGN PATENT DOCUMENTS 1566536 of 0000 United Kingdom .

*Primary Examiner*—Gerald L. Briganee
*Attorney, Agent, or Firm*—Thomas A. Briody; William J. Streeter; Edward W. Goodman

[57] ABSTRACT

A circuit for transmitting in opposite directions two pulse-shaped signals via one connecting terminal(K) of a semiconductor body. When one signal is transmitted the signal path for the other signal is inhibited, which is accomplished by means of switching means (1, 2, 3, 4). A possible use of said circuit is one in which, via the same connecting terminal, a synchronizing signal for synchronizing the field deflection in a television receiver is first applied to the semiconductor body and a blanking pulse is produced from said body thereafter.

2 Claims, 2 Drawing Figures

CIRCUIT ARRANGEMENT FOR TRANSMITTING TWO SIGNALS OVER ONE LINE IN OPPOSITE DIRECTIONS

BACKGROUND OF THE INVENTION

The invention relates to a circuit arrangement, a portion of which is integrated within a semiconductor body, while the remaining portion is disposed outside said semiconductor body, for transmitting a first pulse-shaped signal from a first signal source via a connecting terminal of the semiconductor body to a first receiving circuit portion and for transmitting a second pulse-shaped signal from a second signal source in the reverse direction via the same connecting terminal to a second receiving circuit.

Such a circuit is disclosed in U.S. Pat. No. 4,173,769. This patent specification employs signal sources whose internal resistances considerably deviate from each other, it being necessary that the circuit be of a special construction.

SUMMARY OF THE INVENTION

It is an object of the invention to provide a circuit of the above-defined type in which the two signal sources need not satisfy requirements as regards the internal resistance, so that a greater flexibility in the implementation of the circuit is possible.

The invention provides a circuit of the type described in the opening paragraph which is characterized in that the first signal source is connected to the first receiving circuit portion through first switching means when said first signal is to be transmitted to said first receiving circuit portion at which times the connection between the second signal source and the second receiving circuit is interrupted by means of second switching means, said first switching means being conductive while the second switching means is non-conductive when the first signal is transmitted to said first receiving circuit portion.

Thus, in the circuit in accordance with the invention the two signals are transmitted alternately: when one signal is produced the transmission path is blocked for the other signal. The circuit may be further characterized in that for changing-over the switching means, one of said signals has precedence over the other signal, such that on the occurrence of said one signal transmission over the connection for the other signal is interrupted, transmission over the connection for the other signal being established only during those periods when the one signal is absent.

The circuit may have a signal control circuit for ascertaining the presence of the first and/or the second signal and for controlling the condition of the switching means.

Herein one of the switching means may be formed by an element transmitting signals in one direction only which element is active as part of a signal control circuit. At one of the receiving circuit portions the received signal may be applied to the input electrode of an amplifier element whilst at one of the signal sources the transmitted signal may be derived from the output electrode of an amplifier element.

At one of the signal sources the transmitted signal may be applied to the connecting terminal via a diode which is thereby rendered conducting whilst at one of the receiving circuit portions the received signal may be derived from the connecting terminal via a diode which is rendered conducting thereby.

DESCRIPTION OF THE DRAWINGS

The above and other features of the invention will now be further described by way of non-limitative examples with reference to the accompanying drawing in which:

Referring to FIG. 1 a first signal is supplied from a first signal source A and applied to a connecting line, which has a terminal K, via a switch 1 which is closed (conducting) in a given state, for example the quiescent state. Said terminal may form a connecting point of an integrated circuit which in FIG. 1 is provided on the left of the terminal K and which is in connection with external circuit portions on the right of the terminal, which terminal may be of any construction, for example in the form of a soldered connection. The left half of FIG. 1 shows a receiving circuit portion B for the first signal in which a switch 2 is also in the closed condition in the corresponding state. In a corresponding manner a circuit is formed for a second signal applied from a second signal source C to a receiving circuit portion D via a switch 3, which in FIG. 1 is shown in the open (non-conducting) state, the connecting line to the terminal K and a switch 4 which is also shown in the non-conducting state. Herein switches 1 to 4 are electronic switches of a known type, for example transistors.

Figure 1:
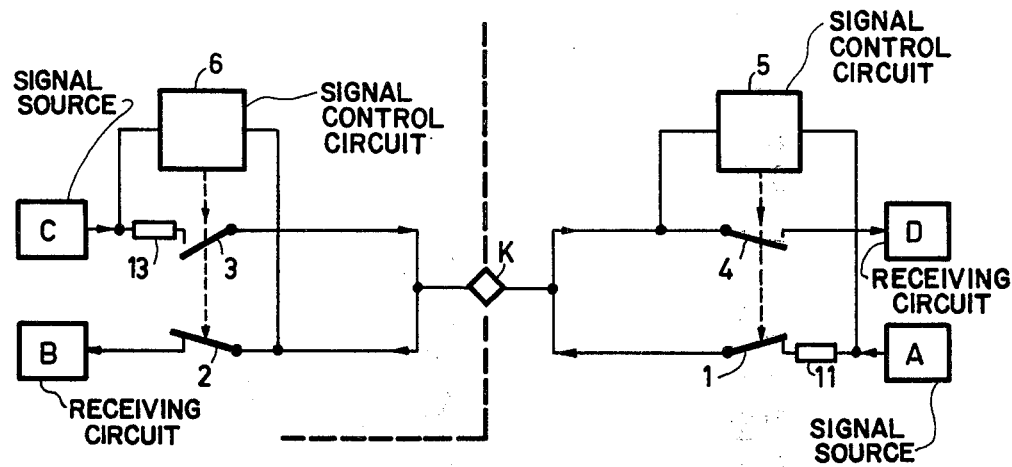
FIG. 1 shows a basic diagram of a circuit arrangement in accordance with the invention.

A signal control circuit 5 is connected on one side to the signal source A and on its other side to the line connecting with terminal K; a similar signal control circuit 6 is connected on one side to the source C and on its other side to the line connecting with terminal K. When a first signal is produced it can be transmitted unimpededly from source A to portion B. If, however, the second signal from source C is produced, this is detected by means of the signal control circuit 6, which then produces a switching criterion to close the switch 3 and to open the switch 2. Now the second signal can be transmitted over the line and is applied to terminal K. At this terminal K the second signal is detected by circuit 5, which now produces a switching criterion, so that switch 1 is opened and switch 4 is closed. Then the transmission path for the second signal from source C to portion D is through-connected and the transmission path for the first signal is interrupted at switches 1 and 2.

If switches 1 and 3 are in the closed state, then the two inputs of the signal control circuits 5 and 6 are connected in FIG. 1 to the same circuit path and to the line and the terminal K. Consequently, the circuits 5 and 6 cannot ascertain without further measures in which direction the signal is at present being transmitted and whether a change-over is necessary. The occurrence of the first and second signal, respectively can however be ascertained unambiguously, as resistors 11 and 13 are respectively included in the lead of each switch 1 and 3, respectively. If the relevant signal current flows, then a difference signal is produced between the two inputs of the associated signal control circuits 5 and 6, respectively; as a result thereof the switching criterion required for at least one of the switches 1 to 4 can be established in the relevant signal control circuit. It may also be suitable to connect the inputs of circuits 5 and 6, respectively, which are connected to the signal sources A and C, respectively, in a different way to separate outputs of sources A and C, respectively, which now carry the first and second signal, respectively, at the occurrence thereof.

The first and the second signal, which are both pulse-shaped, may also be distinguished in that they differ from each other, for example as regards their polarity, positive or negative, with respect to a reference level, their edge variation, for example as an ascending or a descending edge of a pulse or as pulse edges having different slopes. The first and the second signal may also be transmitted in different amplitude ranges so that they can be separated and identified by means of an amplitude threshold circuit. Finally, the signals may be modulated on carrier waves having different frequencies so that they can be identified in known manner. The relevant demodulation and identification arrangements, respectively may then be included in the circuits 5 and 6 and one or more switches may be omitted.

The transmission of one of the two signals may be given priority, not only in the quiescent condition but also in the normal operating condition. Then the other signal path must be interrupted each time this favored signal is produced. In this way a disturbance of the favored signal can be avoided, if it is produced after the unfavored signal.

Figure 2:
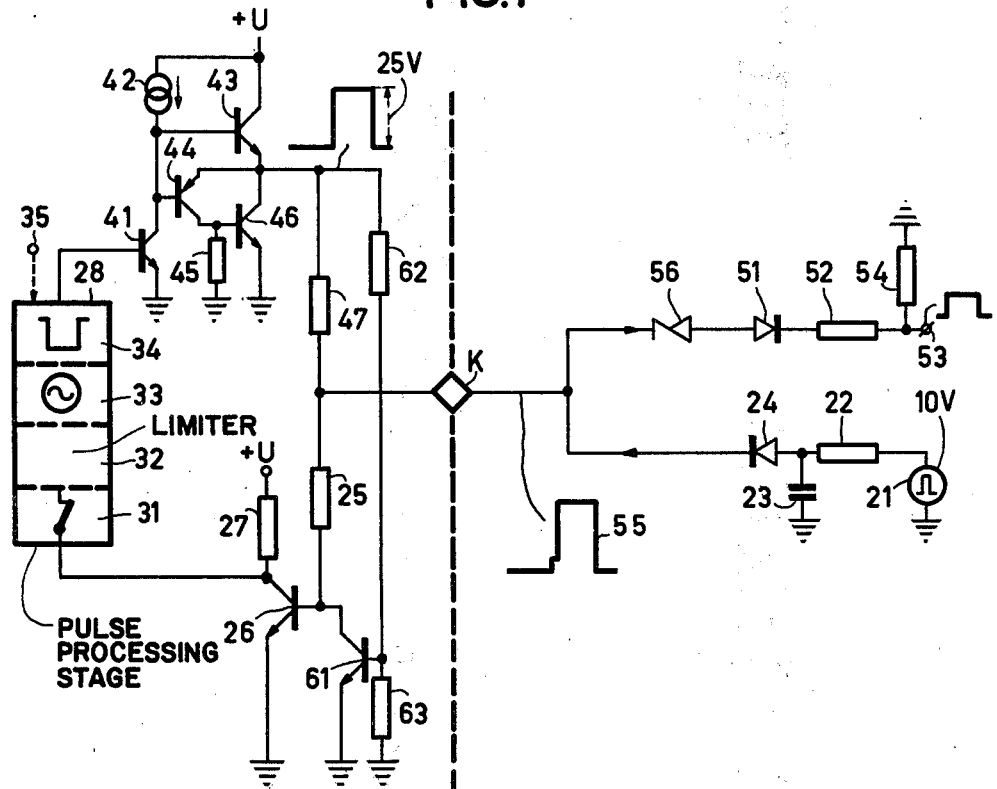
FIG. 2 shows an embodiment of the invention in greater detail.

FIG. 2 shows an embodiment in greater detail. Signal source A is there formed by a pulse generator 21 which produces positively going synchronizing pulses having an amplitude of 10 V and a frequency of 50 Hz for synchronizing the field deflection circuit in a television receiver. Via an isolation element formed by a series resistor 22, which has a value of 4.7 kΩ, and a capacitor 23 to ground which has a value if 10 nF, these pulses are applied to the anode of a diode 24 the cathode of which is connected to the lead with the terminal K.

From the terminal K onwards, the pulses are applied to portions, not shown in FIG. 2, of the integrated circuit and also, via an isolation resistor 25 having a value of 2.5 kΩ, to the base of an npn transistor 26, the emitter of which is connected to ground. From the collector of transistor 26, which, via a 5 kΩ load resistor 27, is connected to the positive terminal of a supply source U of, for example, 28 V, the negative terminal of which is connected to ground, the synchronizing pulses forming the first signal are applied to a pulse processing stage 28. An input section 31 of said stage comprises a switch which is opened as soon as the ascending edge of a synchronizing pulse is received. In a subsequent stage 32 any low-amplitude interferences are removed from the pulses by a limiting circuit and the ascending edge triggers an oscillator 33. Said oscillator produces, as the case may be after shaping by means of a stage 34, a blanking pulse which is of a considerably longer duration compared with the applied synchronizing pulse. This pulse, which forms the second signal is therefore not generated until the leading edge of a synchronizing pulse has occurred at the input of the stage 28.

The second signal is applied to the base of an npn transistor 41 the emitter of which is connected to ground and the collector to the positive terminal of the supply source U via a current source 42. The base of an npn transistor 43, the collector of which is connected to +U, is also connected to the collector of the transistor 41; in addition, the base of a pnp transistor 44 is connected to the collector of the transistor 41, the collector of said transistor 44 being connected to a resistor 45 which has a value of 3.9 kΩ and to the base of a pnp transistor 46 the emitter of which, and also the other terminal of resistor 45, are connected to ground. The emitters of the transistors 43 and 44 and the collector of transistor 46 are interconnected and connected to the lead with the terminal K via an isolating resistor 47 which has a value of 500 Ω.

Under the control of stage 28, there is produced at the common junction of the transistors 43 and 46 a pulse of the field frequency which has an amplitude of 25 V, which is suitable for blanking the electron beam generated in a picture display tube and which is applied to the anode of a diode 51 via the lead. Via a resistor 52 which has a value of 28 KΩ, the cathode of said diode is connected to an output terminal 53 of the receiving circuit for the second signal, said terminal furthermore being connected to ground via a resistor 54 which has a value of 10 kΩ.

When, in the circuit shown in FIG. 2, a synchronizing pulse is applied by the generator 21, this results in the generation of a blanking pulse. As in the circuit shown, no bias voltage is applied to the diode 51, also the synchronizing pulse is transmitted with a low voltage level via this diode, so that the pulse 55, which occurs on the lead and which has a first level of approximately 1.5 V which corresponds to the synchronizing pulse and, somewhat later, a second level of approximately 20 V, is also transferred to the output terminal 53 with a corresponding voltage distribution. The diode 24 then functions as switch 1 in FIG. 1 and prevents the blanking pulse from being fed back to the generator 21. The diode 51 prevents the pulses from the output terminal 53 and from the circuits connected thereto from reaching the terminal where they might possibly act as a synchronizing pulse. Consequently, the diode 51 operates as an independent switch such as switch 4 in FIG. 1, which only transmits the required blanking pulses in the desired direction. By means of a zener diode 56 which is arranged in series with diode 51, the situation is obtained in which only the pulse portions exceeding the zener voltage reach the output terminal 53, whereby it is ensured that synchronizing pulses produced by generator 21 do not appear at the output terminal 53.

The output stage, because of its implementation with transistors 41 to 46, transmits blanking pulses from processing stage 28 to terminal K and is, in principle, inhibited in the opposite direction. Switch 31 is controlled in such manner that only the ascending edge of the synchronizing pulse is passed to the oscillator 23, while the ascending edge of the blanking pulse which travels along the same path, also via the transistor 26, is inactive.

Processing stage 28, its portion 34 in particular, may alternatively be of such a construction that it produces a continuous blanking signal, for example when it is controlled by a signal from a terminal 35. In this way the picture display can be switched off at the occurrence of a disturbance, for example when the deflection becomes inoperative.

The blanking signal has priority as regards through-connection. If, from a guard circuit a continuous signal is produced for signal blanking, then this signal is continuously through-connected to the output terminal 53, independent of the synchronizing pulses.

The blanking pulses may be derived at the source side from the output of the transistors 43 and 46 via a diode the direction of conduction of which is such that for the second signal it is passed-through in the forward direction, said diode replacing resistor 47. In this way the second signal may be applied to the terminal K, with a very low impedance, while the first signal, which travels in the opposite direction, meets with a very high impedance at the diode and is therefore not loaded.

Inhibiting the travel of the first signal to stage 28 via the transistor 26, can still be improved by connecting the collector of an npn transistor 61, the emitter of which is connected to earth, to the base of the transistor 26, the base of said transistor 61 being connected to the outputs of transistors 43 and 46 via a voltage divider 62, 63. At the occurrence of the blanking pulse, the transistor 61 is rendered conductive, so that the voltage between the base and the emitter of the transistor 26 is reduced to a value which cuts off this transistor. The blanking pulse can then no longer drive transistor 26. Once the trailing edge of the blanking pulse has occurred, then the path to transistor 26 and processing stage 28 is no longer inhibited and the next synchronizing pulse can be passed on to transistor 26.

What is claimed is:

1. A circuit arrangement, having a first portion included within a semiconductor body and a second portion disposed outside said semiconductor body, for transmitting a first pulse-shaped signal from a first signal source in said second portion, via a connecting terminal of said semiconductor body, to a first receiving circuit in said first portion, and for transmitting a second pulse-shaped signal from a second signal source in said first portion, in the reverse direction via said connecting terminal, to a second receiving circuit in said second portion, characterized in that said circuit arrangement further comprises first switching means, comprising, in said second portion, a diode coupled between said first signal source and said connecting terminal, for coupling said first signal source to said first receiving circuit when said first pulse-shaped signal is to be transmitted to said first receiving circuit, and second switching means comprising, in said first portion, a first transistor having a base connected to said second signal source, an emitter connected to ground and a collector connected to a positive supply source via a current source, a second transistor having a base connected to the collector of said first transistor, a collector connected to said positive supply source, and an emitter coupled to said connecting terminal, a third transistor having a base also connected to the collector of said first transistor, an emitter connected to the emitter of said second transistor, and a collector coupled to ground, and a fourth transistor having a base connected to the collector of said third transistor, an emitter connected to ground, and a collector connected to the emitters of said second and third transistor, said first, second and fourth transistors being of the same conductivity type and opposite that of said third transistor, and in said second portion, a diode coupled between said connecting terminal and said second receiving circuit, for decoupling said second signal source from said second receiving circuit when said first switching means is conductive.

2. The circuit arrangement as claimed in claim 1, wherein said circuit arrangement is incorporated in a television field deflection circuit arrangement, characterized in that said first signal source comprises a pulse generator for producing synchronizing pulses at the field frequency of the applicable television standard, and said first receiving circuit and said second signal source comprise a pulse processing stage having a switching circuit which opens upon receipt of an ascending edge in each of said synchronizing pulses, a limiting circuit coupled to said switching circuit for removing any low-amplitude interference, an oscillator for producing a signal at the field frequency, said oscillator being triggered by said ascending edges of the synchronizing pulses after being limited, and a pulse shaper coupled to the output of said oscillator for forming vertical blanking pulses.

* * * * *